United States Patent
Schneider

(10) Patent No.: US 8,499,285 B2
(45) Date of Patent: Jul. 30, 2013

(54) METHOD OF LOGGING STACK TRACE INFORMATION

(75) Inventor: Eric R. Schneider, Lexington, MA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 990 days.

(21) Appl. No.: 11/851,207

(22) Filed: Sep. 6, 2007

(65) Prior Publication Data

US 2009/0300427 A1 Dec. 3, 2009

Related U.S. Application Data

(60) Provisional application No. 60/957,564, filed on Aug. 23, 2007.

(51) Int. Cl.
*G06F 9/44* (2006.01)
*G06F 9/45* (2006.01)
*G11C 29/00* (2006.01)

(52) U.S. Cl.
USPC ............................. 717/124; 717/140; 714/723

(58) Field of Classification Search
USPC ................... 717/124–135, 140; 714/37, 38.1, 714/723
See application file for complete search history.

(56) References Cited

U.S. PATENT DOCUMENTS

| | | | | |
|---|---|---|---|---|
| 5,533,192 A | * | 7/1996 | Hawley et al. | 714/28 |
| 5,784,552 A | * | 7/1998 | Bishop et al. | 714/38 |
| 6,449,709 B1 | * | 9/2002 | Gates | 712/202 |
| 6,470,388 B1 | * | 10/2002 | Niemi et al. | 709/224 |
| 6,490,721 B1 | * | 12/2002 | Gorshkov et al. | 717/130 |
| 6,550,058 B1 | * | 4/2003 | Wynn | 717/158 |
| 6,862,711 B1 | * | 3/2005 | Bahrs et al. | 715/205 |
| 6,951,012 B2 | * | 9/2005 | McGeorge, Jr. | 717/124 |
| 7,302,675 B2 | * | 11/2007 | Rogers et al. | 717/125 |
| 7,353,508 B2 | * | 4/2008 | Bowers et al. | 717/162 |
| 2003/0046663 A1 | * | 3/2003 | Rogers et al. | 717/125 |
| 2003/0066052 A1 | * | 4/2003 | McGeorge, Jr. | 717/124 |
| 2003/0088854 A1 | * | 5/2003 | Wygodny et al. | 717/130 |
| 2003/0140338 A1 | * | 7/2003 | Bowers et al. | 717/162 |

OTHER PUBLICATIONS

Bender, Ryan, "Structure of the Compiler," Apr. 2000, <http://mitpress.mit.edu/sicp/full-text/sicp/book/node126.html>, p. 1-4.*
Sandeep.S, "GCC-Inline-Assembly-HOWTO," Mar. 2003, <http://www.ibiblio.org/gferg/ldp/GCC-Inline-Assembly-HOWTO.html>, p. 1-13.*
Venkatesan et al., "Testing and Debugging Distributed Programs Using Global Predicates," Feb. 1995, IEEE, p. 163-177.*

* cited by examiner

*Primary Examiner* — Qing Chen
(74) *Attorney, Agent, or Firm* — John Tarlano

(57) ABSTRACT

A computer system comprises a memory configured to store software instructions; a set of registers; and a processing unit configured to temporarily store passed parameters in the set of registers during execution of the software instructions, the processing unit is further configured to skip save and restore operations when executing a logging function to log the passed parameters.

7 Claims, 4 Drawing Sheets

| | | |
|---|---|---|
| R0 | | |
| R1 | - | stack pointer |
| R2 | - | small data area 2 base pointer |
| . | | |
| R3 | - | argument 1 |
| R4 | - | argument 2 |
| . . . | | |
| R10 | - | argument 8 |
| R11 | | |
| R12 | | |
| R13 | - | small data area base pointer |
| . | | |
| R14 | - | called function saves/restores |
| . | | |
| . . . | | |
| R29 | - | called function saves/restores |
| . | | |
| R30 | | |
| R31 | | |

METHOD OF LOGGING STACK TRACE INFORMATION

CROSS REFERENCE TO RELATED APPLICATIONS

This application is related to and claims priority to the filing date of U.S. Provisional Application Ser. No. 60/957,564, entitled "METHOD OF LOGGING STACK TRACE INFORMATION", filed on Aug. 23, 2007, which is incorporated herein by reference.

GOVERNMENT LICENSE RIGHTS

The U.S. Government may have certain rights in the present invention as provided for by the terms of contracts N00030-05-C-0007 (Prime) and SC001-0000000145 (subcontract) awarded by the United States Navy.

BACKGROUND

Debugging of software in real-time on real hardware often requires logging of debug data. When an error occurs in a real-time system, debug data logging is used to provide a context for the error.

Real-time debug data logging often captures the control flow of software and often includes data flow. One example, called a back-trace, provides a trace of the function calls in a program including the passed function parameters. Another example is a trace of the semaphore calls in an operating system including the data needed to identify all inter-process communications. These two examples are illustrative and do not represent a complete set.

Hardware debuggers such as in-circuit-emulators (ICE) allow debugging without overhead. Unfortunately, compilers typically optimize out function parameters which results in an ICE back-trace that does not contain the passed function parameters. Additionally, ICE debuggers halt software execution and thus end real-time operation.

Software can save data to implement real-time data logging. Software logging typically incurs a significant performance penalty for several reasons. One reason is the invocation of the logging function itself. Software logging is performed either as an in-line function or as a function call to a logging function. The in-line approach increases image size and reduces cache-hit ratios resulting in executing more instructions and with longer access time respectively. The function call approach increases image size and stack access since many registers are saved on the stack when calling a function.

Software data logging is used on embedded computers and personal computers in military and commercial applications on software images of nearly any size.

SUMMARY

The above mentioned problems and other problems are resolved by the present invention and will be understood by reading and studying the following specification.

In one embodiment, a computer system is provided. The computer system comprises a memory configured to store software instructions; a set of registers; and a processing unit configured to temporarily store passed parameters in the set of registers during execution of the software instructions, the processing unit further configured to skip save and restore operations when executing a logging function to log the passed parameters.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which:

FIG. 2 is a block diagram showing a more detailed view of one embodiment of the registers in FIG. 1.

DETAILED DESCRIPTION

In the following detailed description, embodiments are described in sufficient detail to enable those skilled in the art to practice the present invention. It is to be understood that other embodiments may be utilized without departing from the scope of the present invention. The following detailed description is, therefore, not to be taken in a limiting sense.

Embodiments of the present invention improve the performance of software logging by skipping the save and restore operations normally associated with calling a logging function. By skipping the save and restore operations, processing time is saved.

Figure 1:
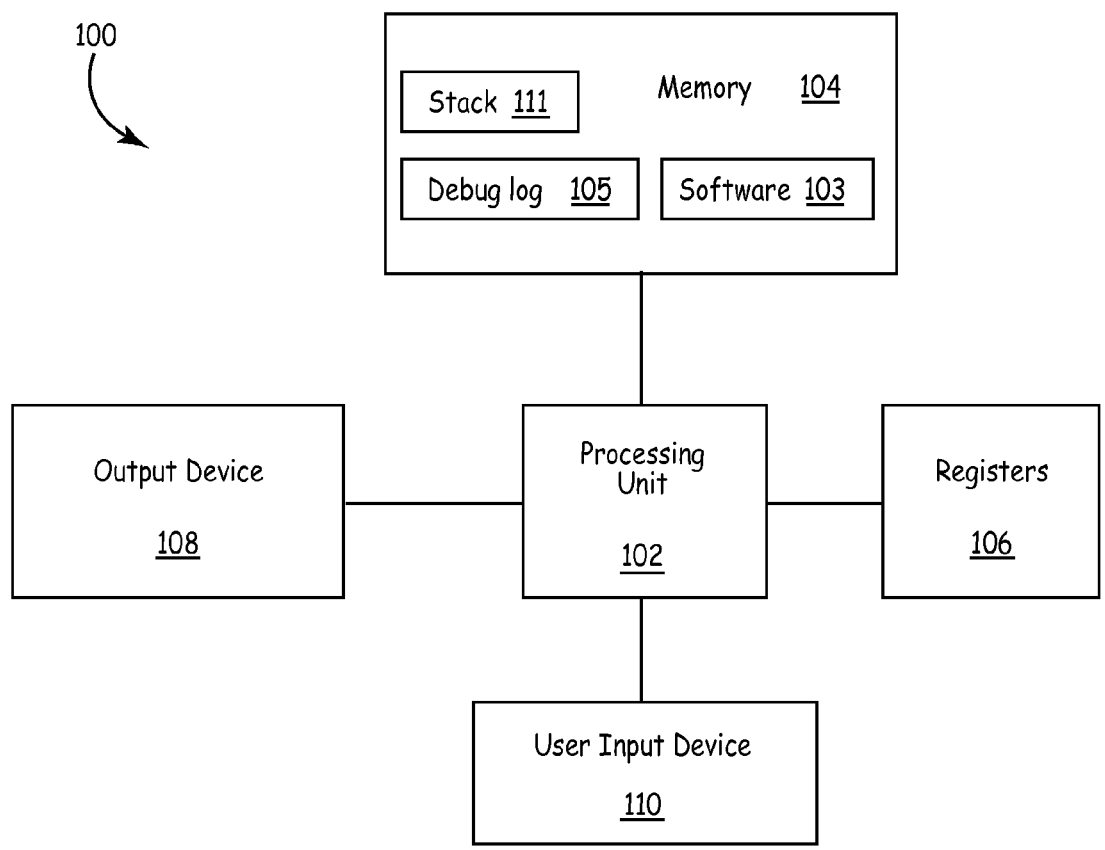
FIG. 1 is a block diagram of a computer system according to one embodiment of the present invention.

FIG. 1 is a block diagram of a computer system 100 according to one embodiment of the present invention. System 100 includes a memory 104 which stores software 103, such as program source code and logging functions. In addition, in some embodiments, memory 104 also stores a debug log 105. Memory 104 is implemented as any appropriate computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks (e.g., floppy disks); magneto-optical disks; CDs, DVDs, or other optical storage disks; nonvolatile ROM, RAM, and other like media. Notably, although memory 104 is shown as one block unit in FIG. 1, it is to be understood that memory 104 can be comprised of more than one type of computer readable medium. For example, software instructions 103 may be stored on non-volatile ROM, whereas debug log 105 is stored on a flash memory device.

System 100 also includes a processing unit 102 with its associated set of registers 106. Processing unit 102 executes the software instructions stored on memory 104. For a given processing unit executing a given program, a specific set of registers are loaded with the calling parameters (also referred to as arguments) to a function. For many compiler/processing unit combinations this interface convention is referred to as an Application Binary Interface (ABI). These registers are saved to and restored from stack 111 in memory 104 between function calls until they are used. Additionally, registers are typically re-used when their parameters are no longer needed.

This re-use of registers corrupts a back-trace since the original parameters being sought were replaced when the registers were re-used for new parameters.

For example, if a function is called with the parameters a, b, and c. Parameter "a" is moved to a particular register such as register r3 in FIG. 2. Similarly parameters "b" and "c" are each moved to a register such as registers r4 and r5. As the function performs calculations, if it no longer needs parameter "b", for example, it may use register r4 as a scratchpad. If the function itself then calls another sub-function, parameters a, c and scratchpad registers are each saved in memory 104 on stack 111 if they are still needed when the sub-function returns. It is beneficial in certain situations to perform the save and restore operations. For example, if the compiler is uncertain how a called sub-function will affect the passed parameters, the parameters are saved in case the sub-function changes the parameter values and the original passed parameter values are subsequently needed.

However, the save and restore operations of the compiler function call mechanism cause additional stack access which increases the overhead for a call to a logging function for software debugging. To illustrate the increased overhead, consider the following example function:

```
int exampleFunction(int a, int b, int c, int d, int e)
{
int result;
result = a + b/c + d/e;
return result;
}
```

The above example function passes five parameters a, b, c, d, and e which are placed in registers r3, r4, r5, r6, and r7 respectively. In a PowerPC environment, the compiler converts the example function to the following assembly code.

```
 0:  7c a4 2b d6   divw   r5,r4,r5
 4:  7c e6 3b d6   divw   r7,r6,r7
 8:  7c a5 1a 14   add    r5,r5,r3
 c:  7c 65 3a 14   add    r3,r5,r7
10:  4e 80 00 20   blr
```

Line 0 divides parameter "b" by parameter "c" and saves the result in register r5. Line 4 divides parameter "d" by parameter "e" and saves the result in register r7. Line 8 adds parameter "a" to the division result saved in register r5 and saves the result of the addition to register r5. Line c adds the addition result in register r5 to the division result in register r7 and saves the result of the addition to register r3. Line 10 indicates the end of the function.

The assembly code of an exemplary logging function, named logEntry1 in this example, is shown below:

```
            logEntry1:
LOAD32 r11, 0x500C0000
dcbz     0, r11
stw      r3, 0(r11)
stw      r4, 0(r11)
stw      r5, 0(r11)
stw      r6, 0(r11)
stw      r7, 0(r11)
dcbf     0, r11
blr
```

The above function saves each of the parameter values in registers r3 through r7 to an address in memory 104. An in-line function call to the logEntry1 function is shown inserted in the example function below:

```
int exampleFunction(int a, int b, int c, int d, int e)
{
logEntry1( );
int result;
result = a + b/c + d/e;
return result;
}
```

The additional save and restore operation overhead of the normal compiler function call mechanism when calling the logEntry1 function is shown in the assembly code below:

```
 0:  94 21 ff d8    stwu    r1,-40(r1)
 4:  7c 08 02 a6    mflr    r0
 8:  93 21 00 0c    stw     r25,12(r1)
 c:  7c b9 2b 78    mr      r25,r5
10:  93 a1 00 1c    stw     r29,28(r1)
14:  7c 9d 23 78    mr      r29,r4
18:  93 61 00 14    stw     r27,20(r1)
1c:  7f bd cb d6    divw    r29,r29,r25
20:  93 81 00 18    stw     r28,24(r1)
24:  7c fb 3b 78    mr      r27,r7
28:  7c dc 33 78    mr      r28,r6
2c:  93 41 00 10    stw     r26,16(r1)
30:  90 01 00 2c    stw     r0,44(r1)
34:  7c 7a 1b 78    mr      r26,r3
38:  48 00 00 01    bl      38 <test+0x38>
3c:  80 01 00 2c    lwz     r0,44(r1)
40:  83 21 00 0c    lwz     r25,12(r1)
44:  7c 08 03 a6    mtlr    r0
48:  7f 9c db d6    divw    r28,r28,r27
4c:  7f bd d2 14    add     r29,r29,r26
50:  83 61 00 14    lwz     r27,20(r1)
54:  83 41 00 10    lwz     r26,16(r1)
58:  7c 7d e2 14    add     r3,r29,r28
5c:  83 81 00 18    lwz     r28,24(r1)
60:  83 a1 00 1c    lwz     r29,28(r1)
64:  38 21 00 28    addi    r1,r1,40
68:  4e 80 00 20    blr
```

As can be seen, the save and restore operations added an additional 22 lines of code for stack access. In particular, for each parameter in registers r3 through r7, the parameter is moved to another register (the mr mnemonic), saved to memory 104 (the stw mnemonic), and then loaded back to a register from memory when needed (the lwz mnemonic). These additional lines of code for stack access are what increase image size and reduce performance when calling a logging function. The branch to the logging function is located on line 38 and indicated by the mnemonic "bl".

However, embodiments of the present invention are configured such that the normal save and restore operations are skipped when logging function parameters for debugging purposes. By skipping the save and restore operations, embodiments of the present invention improve performance resulting in faster parameter logging. In one embodiment, the logging function is defined as an in-line assembly function call. For example, in the PowerPC environment, the exemplary logging function logEntry1 shown above is used to define a function named LOG_ENTRY1 as shown below:

define LOG_ENTRY( ) asm volatile("bl logEntry1"::);

This line of code causes a branch jump to the function logEntry1 whenever the function LOG_ENTRY1 is called. As stated above, when a function call is used, the compiler normally saves and restores the parameter registers in case the function changes the original parameters. This behavior is bypassed by directing the compiler to directly insert the assembly instruction. In this embodiment, the assembly keywords "asm volatile" are used to direct the compiler to directly insert the assembly instruction. In other words, the compiler is instructed to not worry about the effects that the assembly function call may have on the parameters. The result is that the compiler skips the normal save and restore operations and simply branches to the assembly function. For example, including an in-line function call to LOG_ENTRY1 in the above example function is shown below:

```
int exampleFunction(int a, int b, int c, int d, int e)
{
LOG_ENTRY1( );
int result;
result = a + b/c + d/e;
return result;
}
```

The resulting assembly code of this example function in a PowerPC environment is shown below:

```
 0: 48 00 00 01    bl      0 <test>
 4: 7c a4 2b d6    divw    r5,r4,r5
 8: 7c e6 3b d6    divw    r7,r6,r7
 c: 7c a5 1a 14    add     r5,r5,r3
10: 7c 65 3a 14    add     r3,r5,r7
14: 4e 80 00 20    blr
```

As can be seen in the assembly code above, defining the logging function as described in this embodiment of the present invention results in only one additional line of assembly code which branches to the assembly logging function. Thus, the additional processing time and overhead associated with the normal save and restore operations are avoided.

In another embodiment of the present invention, the compiler is configured to skip the normal save and restore operations for logging functions by defining a compiler options directive (also referred to as a "pragma" in C/C++) for the logging function. Compiler options directives are used to specify how a compiler should process inputs and functions. Thus, rather than defining the logging function as described above, the pragma option is applied to the logging function such that the pragma is visible where the logging function is called. The result is that the normal save and restore operations are skipped when the function call is made to the logging function which results in improved performance as described above. An example of this is shown below:

```
void logEntry1( );
#pragma ABI_VOLATILE (logEntry1, r11);
```

In the example above the compiler is told that logEntry1 only uses register r11. Hence, the compiler skips the save and restore operations for the other registers (e.g. registers r3-r7 which contain the parameters to be logged in the above example.) The compiler is then able to judge if r11 is saved and restored when calling logEntry1 based on the ABI for the specific CPU and programming language combination. The register r11 could be followed by any number of additional comma separated registers to enumerate the registers corrupted by the named function (in this case logEntry1). In other embodiments this pragma is used to improve the performance of non-logging software by limiting the register save and restore process.

In operation, processing unit 102 executes software 103 stored in memory 104 and temporarily stores passed function parameters in registers 106. When a logging function is called, processing unit 102 logs the passed function parameters stored in registers 106 without performing the normal save and restore operations of the compiler function call mechanism as described above. For example, in one embodiment, processing unit 102 saves the passed function parameters in debug log 105. Processing unit 102 then outputs values in debug log 105 to an output device 108 when needed. For example, in one embodiment processing unit 102 outputs values in debug log 105 on a periodic basis. In other embodiments, processing unit 102 outputs the values when requested by a user using user input device 110. In another embodiment, processing unit 102 outputs values in debug log 105 automatically when an error is encountered. In yet other embodiments processing unit 102 logs the parameters to output device 108 directly, without use of an intermediate debug log 105.

Output device 108 can be implemented, for example, as a printer or electronic display such as a computer monitor. User interface device 110 can be implemented as a keyboard, mouse, touch screen, microphone, etc. Thus, system 100 improves the performance of logging function parameters for debugging purposes and provides the results of the logging to a user when needed.

Figure 3:
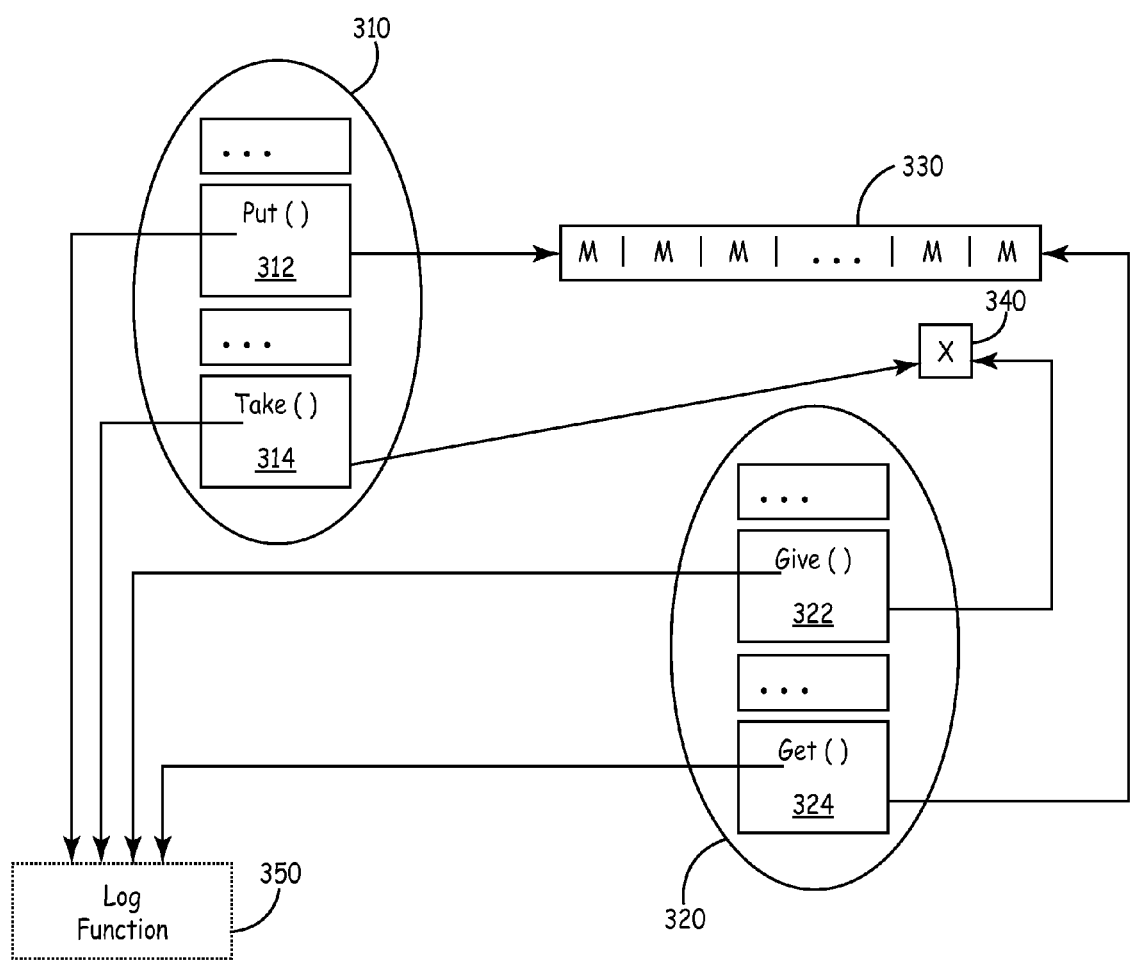
FIG. 3 is a schematic diagram depicting logging of communication between two processes according to one embodiment of the present invention.

FIG. 3 is a schematic diagram depicting logging of communication between two exemplary processes 310 and 320 according to one embodiment of the present invention. Processes 310 and 320 communicate using message block 330 and semaphore 340 as is known to one of skill in the art. In addition, processes 310 and 320 include function calls to a logging function 350 which logs parameters of functions in processes 310 and 320 according to embodiments of the present invention. For example, process 310 includes put function 312 and take function 314. Similarly, process 320 includes give function 322 and get function 324. Put function 312, take function 314, give function 322, and get function 324 each include a function call to logging function 350 as described above. In particular, each function call to logging function 350 skips the normal save and restore operations of the compiler function call mechanism as described above. In this way, logging function 350 is able to log parameters and semaphore calls for real-time software debugging of the communication between processes 310 and 320.

Figure 4:
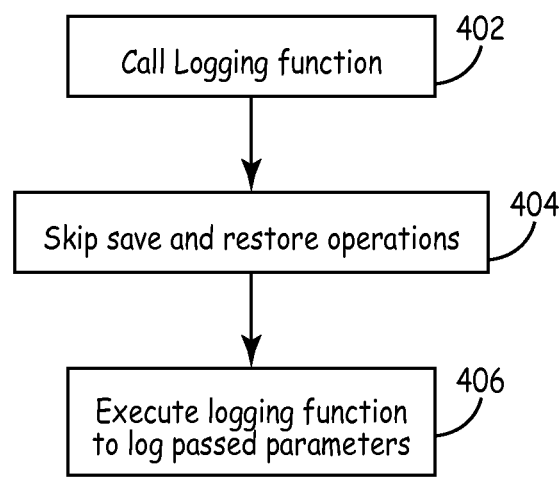
FIG. 4 is a flow chart depicting a method of logging stack trace information according to one embodiment of the present invention.

FIG. 4 is a flow chart showing a method 400 of debugging software according to embodiments of the present invention. At 402, a logging function is called. The logging function records parameters passed to a function to be traced. At 404, save and restore operations, described above, are skipped when the logging function is called. For example, in some embodiments, the save and restore operations are skipped based on keywords used to define the logging function, as described above. In other embodiments, the save and restore operations are skipped based on a compiler options directive associated with the called logging function. One example of a compiler options directive used for skipping the save and restore operations is described above.

At 406, the logging function is executed to log the passed parameters. In some embodiments, the passed parameters are passed directly to an output device such as output device 108. In other embodiments, the passed parameters are logged to a debug log such as debug log 105. In such embodiments, the passed parameters are then output to an output device from the debug log. The passed parameters can be output from the debug log when indicated by user input, on a periodic basis, when an error is encountered, or any combination thereof. The passed parameters can then be used in debugging software instructions. Furthermore, by skipping the save and restore operations when calling the logging function, processing time is saved which improves the performance of software logging.

Although specific embodiments have been illustrated and described herein, it will be appreciated by those of ordinary skill in the art that any arrangement, which is calculated to achieve the same purpose, may be substituted for the specific embodiment shown. Notably, although embodiments of the present invention are described with relation to a PowerPC environment and the C programming language, it is to be understood that other similar configurations to the logging function calls can be made in other computer architecture environments. This application is intended to cover any adaptations or variations of the present invention. Therefore, it is manifestly intended that this invention be limited only by the claims and the equivalents thereof.

What is claimed is:

1. A computer system comprising:
   a memory configured to store software instructions;
   a set of registers; and
   a processing unit configured to temporarily store passed parameters in the set of registers during execution of the software instructions, wherein the processing unit is further configured to define a complier options directive for a passed parameters logging function, wherein the passed parameters logging function is called to log the passed parameters, wherein the processing unit is further configured to activate the complier options directive to skip save and restore operations whenever the passed parameters logging function is called, and wherein the complier options directive is: void logEntry1( ); #pragma ABI_VOLATILE (logEntry1, r11).

2. The computer system of claim 1, wherein the processing unit is further configured to skip save and restore operations when executing the passed parameters logging function based on keywords used in defining the called passed parameters logging function.

3. The computer system of claim 2, wherein the passed parameters logging function is defined using the keywords: asm and volatile.

4. The computer system of claim 1, wherein the processing unit is further configured to skip save and restore operations when executing a passed parameters logging function based on the compiler options directive associated with the called passed parameters logging function.

5. The computer system of claim 1, wherein the memory is further configured to store a debug log, and wherein the processing unit is further configured to log the passed parameters in the debug log.

6. The computer system of claim 5, further comprising:
   a user input device; and
   an output device, wherein the processing unit is further configured to output the passed parameters logged in the debug log to the output device in response to an input received from the user input device.

7. The computer system of claim 1, further comprising:
   an output device, wherein the processing unit is further configured to log the passed parameters directly to the output device.

* * * * *